E. H. FREEMAN.
ELECTRICAL JUNCTION BOX.
APPLICATION FILED APR. 11, 1912.
1,120,472.
Patented Dec. 8, 1914.
2 SHEETS—SHEET 1.
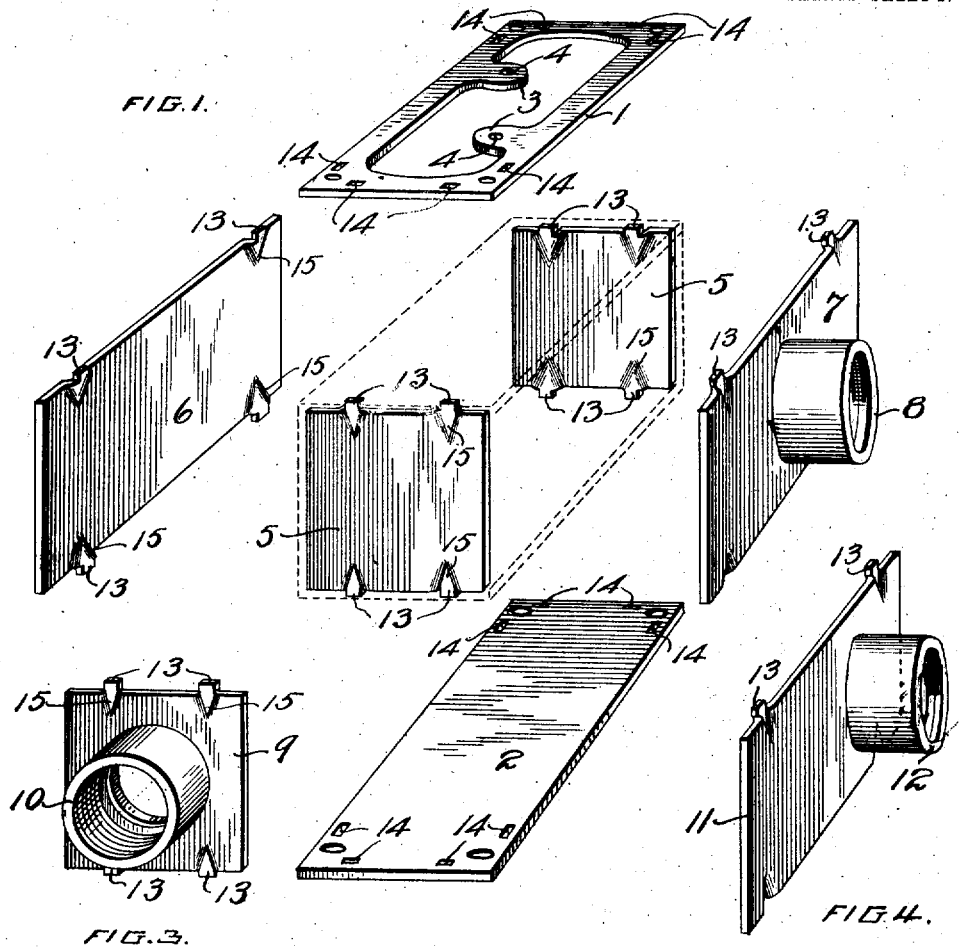
WITNESSES:
INVENTOR
Edgar H. Freeman
BY
Attorney

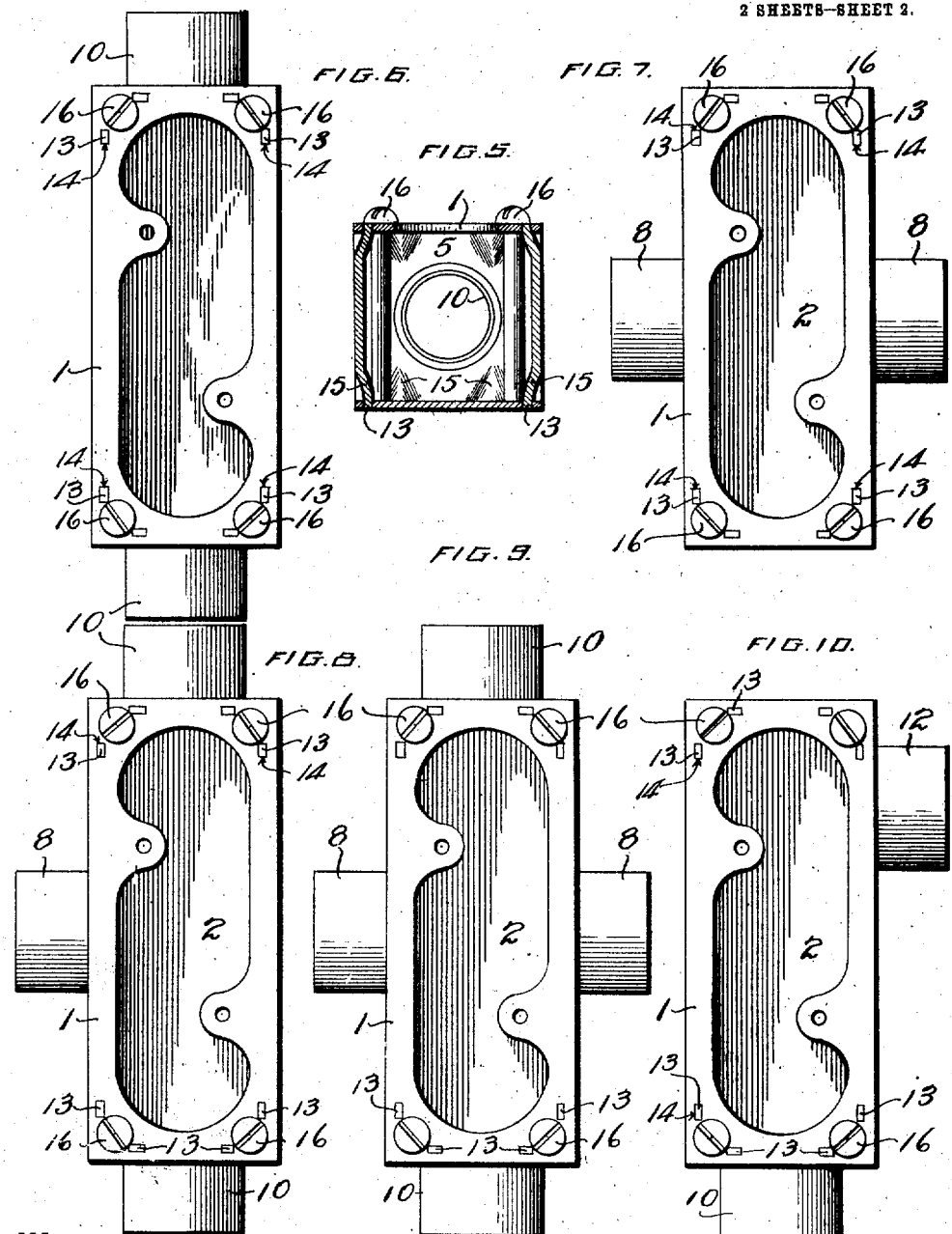

UNITED STATES PATENT OFFICE.

EDGAR H. FREEMAN, OF TRENTON, NEW JERSEY, ASSIGNOR TO E. H. FREEMAN ELECTRIC COMPANY, OF TRENTON, NEW JERSEY, A CORPORATION OF NEW JERSEY.

ELECTRICAL JUNCTION-BOX.

1,120,472.  Specification of Letters Patent.  Patented Dec. 8, 1914.

Application filed April 11, 1912. Serial No. 689,968.

*To all whom it may concern:*

Be it known that I, EDGAR H. FREEMAN, a citizen of the United States, residing at Trenton, in the county of Mercer and State of New Jersey, have invented certain new and useful Improvements in Electrical Junction-Boxes, of which the following is a specification.

The present invention relates to certain new and useful improvements in the construction of outlet or junction boxes, such as are commonly employed for electric wiring.

The primary object of the invention is to provide a comparatively simple and inexpensive outlet box which embodies novel features of construction whereby it can be readily adjusted to provide outlet openings or coupling members for one or more branches as may be desired, thereby obviating the necessity of providing a separate and distinct junction box for each different arrangement of the branches which may be necessary.

A further object of the invention is to provide an outlet box in which sides and ends are removable and interchangeable so as to admit of the parts being assembled in various manners, novel means being provided for holding the sides rigidly in position when the outlet box is assembled and set up for use.

With these and other objects in view, the invention consists in certain combinations and arrangements of the parts as will more fully appear as the description proceeds, the novel features thereof being pointed out in the appended claim.

For a full understanding of the invention, reference is to be had to the accompanying drawings, in which—

Figure 1 is a detail perspective view showing the parts of the outlet box as detached or separated from each other, the position of the parts when assembled being indicated by dotted lines. Fig. 2 is a longitudinal sectional view through the outlet box. Fig. 3 is a detail perspective view of one of the interchangeable ends for the outlet box. Fig. 4 is a detail perspective view of one of the interchangeable sides for the outlet box, the outlet opening and coupling member being arranged toward one end of the side. Fig. 5 is a transverse sectional view through the outlet box. Fig. 6 is a plan view of the outlet box, showing one manner of assembling the same, in which provision is made for branches at opposite ends thereof. Fig. 7 is a similar view showing another manner of assembling the outlet box in which provision is made for branches at the middle portions of opposite sides thereof. Fig. 8 is a similar view showing a further manner of assembling the parts in which provision is made for branches at both ends and at one side of the box, or in T-form. Fig. 9 is a similar view showing a manner of assembling the parts in which provision is made for branches at both ends and also at both sides of the box, or in cross-form. Fig. 10 is also a similar view showing a different manner of assembling the parts in which a branch is provided at one end and at one side of the box, or in L-form.

Like references designate corresponding parts in the several figures of the drawings.

Specifically describing the present embodiment of the invention, the numeral 1 designates the top or open side of the outlet box, and 2 the bottom member which has an opposed relation thereto. The top 1 and bottom 2 are shown in the present instance as rectangular in shape and of an elongated construction, the top or open side 1 being provided at suitable points with the usual lugs or ears 3 which are provided with threaded openings 4. The ends and sides are interposed between the top and bottom and constructed to have an interlocking connection therewith.

As shown in Fig. 1, the ends 5 have a plain construction and serve to close the ends of the box without providing for a branch at either end thereof. The side 6 also has a plain construction and does not provide for a branch connection, although the opposite side 7 is provided at the middle thereof with an outlet opening or nipple 8 surrounding the same. When the parts shown in Fig. 1 are assembled, an outlet box is provided which is closed at both ends and at one side thereof, but which is provided at the middle of the opposite side thereof with a branch connection.

In Fig. 3 is shown an end plate 9 which is interchangeable with either of the ends 5 and is provided with a suitable branch connection 10.

A side 11 is shown by Fig. 4 which can be substituted for either of the sides 6 or 7 or Fig. 1, the said side 11 being formed with a branch connection 12 which is arranged toward one end of the side. The ends being interchangeable with each other, it will be obvious that by using the proper sides and ends in assembling the box, provision can be made for the necessary number of branch connections. As previously stated, the ends and sides fit between the top 1 and bottom 2, and have an interlocking connection therewith so as to be held securely in position and provide a rigid construction when the parts are assembled. Both the end plates and side plates are provided with the lugs 13 which project from opposite edges thereof and are adapted to be received within corresponding keeper openings 14 formed in the top and bottom plates. These lugs 13 are shown as offset inwardly from the plane of the plates so that when the lugs are fitted within the openings 14, the outer surfaces of the plates will be flush with the edges of the top 1 and bottom 2. Where the various parts of the outlet box are stamped from sheet metal, as in the previous instance, the lugs 13 may be conveniently offset from the plates by bending inwardly, as indicated at 15, those portions of the plates which are located adjacent the lugs and carrying the same. The top and bottom are connected, preferably at the corners thereof, by means of suitable fastening members such as the screws 16, the said screws being inserted in position through the screw-receiving openings 16ᵃ and tightened, after the proper side and end members have been assembled between the top and bottom plates to provide for the desired number and arrangement of the outlet connections.

By using two plain side members 6 and the two end members 9, such as are shown in Fig. 3, an outlet box with straightaway end to end connections may be provided, as shown by Fig. 6. In a reverse manner, by using plain end plates 5, and providing two side plates 7 with the branch connections in the middle thereof, an outlet box with straightaway connections from opposite sides thereof may be provided, as indicated by Fig. 7. Should it be desired to provide for three branch connections, two of the end plates 9 might be employed in connection with a plain side 6 and a side plate 7 with a branch in the middle thereof, as indicated by Fig. 8, thus making a T-fitting. It will also be obvious that by providing two of the side plates 7 and two of the end plates 9, a cross-form of outlet box with four branch connections can be provided. It is also very frequently desirable to provide for an L-shaped junction, as indicated in Fig. 10, and this can be readily accomplished by providing one plain end 5 in connection with an end 9, and one plain side 6 in connection with one of the sides 11 shown in Fig. 4, in which the branch connection 12 is arranged at one end of the side. It will thus be obvious that the side members are not only interchangeable, but that the branch connections are arranged at different points upon the respective sides, thereby enabling the position and arrangement of the branches, as well as the number thereof, to be adjusted as found necessary.

From the foregoing description, it will be apparent that a distinct and practical advantage of the present invention over many of the well known forms of outlet or junction boxes resides in the fact that the entire structure may be made of sheet metal stampings in a rapid and economical manner, and the side and end plates having the outlet openings permanently fitted with screw nipples for the coupling thereto of the conduits through which the wire is piped. This provides a much more satisfactory construction from manufacturing, and installation standpoints than the cast-metal types of outlet boxes wherein the pipe nipples or couplings are usually separate pieces and have to be separately attached to the box body. Also, the present invention, by reason of the construction referred to, involves a decided improvement over that type of outlet boxes wherein provision is made for punching out the outlet holes, thus necessitating either a separate tapping operation for the holes or the fitting of the pipe ends therein in an unsatisfactory and insecure manner.

I claim:

An electrical outlet or junction box constructed of sheet metal and consisting of top and bottom plates provided at their corners with screw-receiving openings and with keeper openings adjacent the screw-receiving openings, a plurality of interchangeable sheet metal plates for the sides and ends of the box, each of said side and end plates having projecting-edge lugs adapted to engage certain of said keeper openings of the top and bottom plates, the said lugs being inwardly offset from the plane of the plates, and fastening screws arranged within the corners of the box and extending through the said screw-receiving openings.

In testimony whereof I hereunto affix my signature in the presence of two witnesses.

EDGAR H. FREEMAN.

Witnesses:
SARA M. RANDALL,
ADA MARSH.